May 21, 1968

J. SNYDERMAN 3,383,965

TUBE RECUTTER

Filed Oct. 22, 1965

INVENTOR
JOSEPH SNYDERMAN

BY

ATTORNEY

May 21, 1968     J. SNYDERMAN     3,383,965
TUBE RECUTTER
Filed Oct. 22, 1965     5 Sheets-Sheet 3
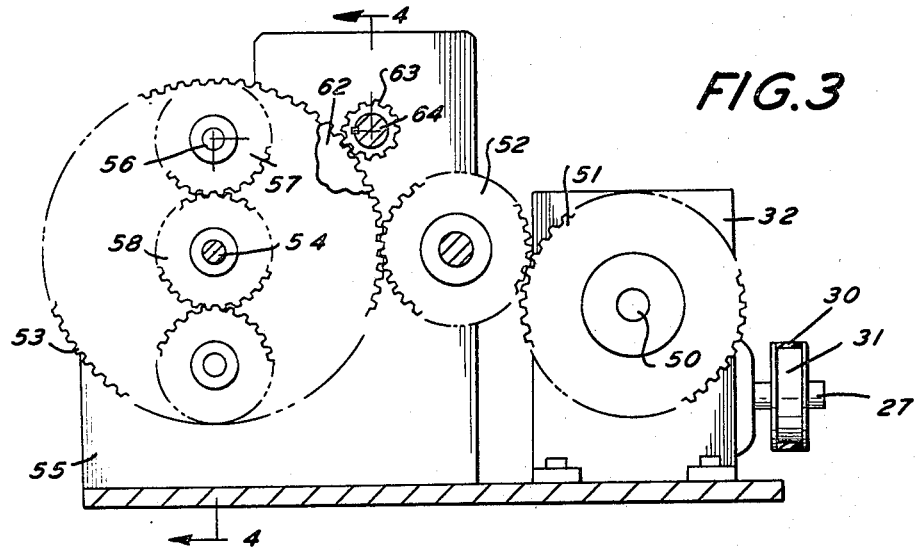
FIG.3
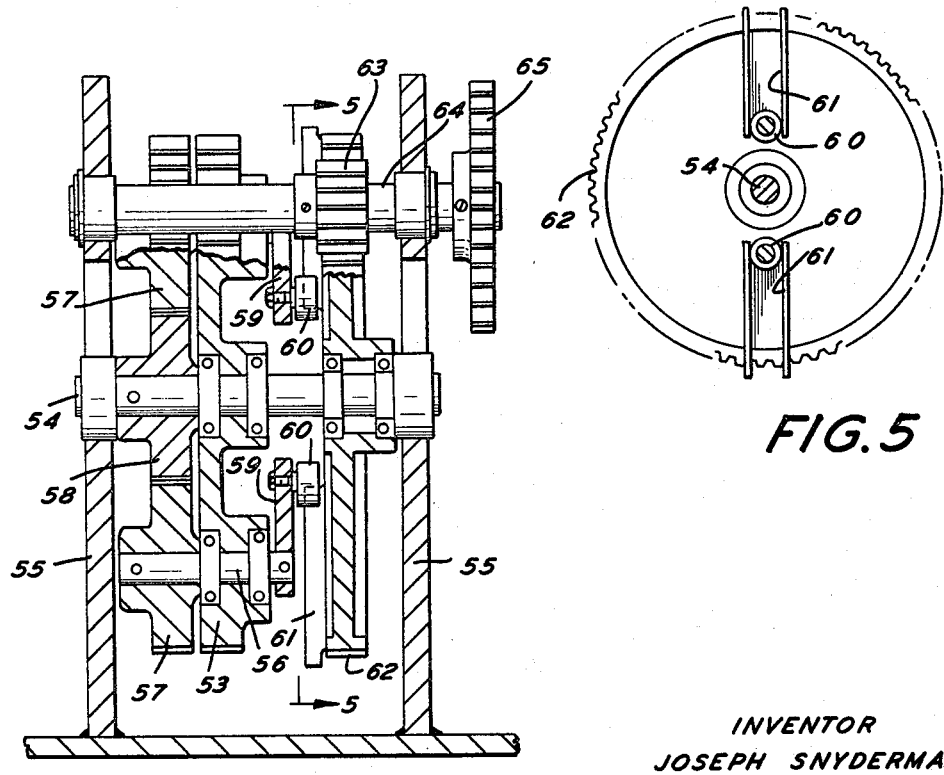
FIG.4
FIG.5
INVENTOR
JOSEPH SNYDERMAN
BY
ATTORNEY

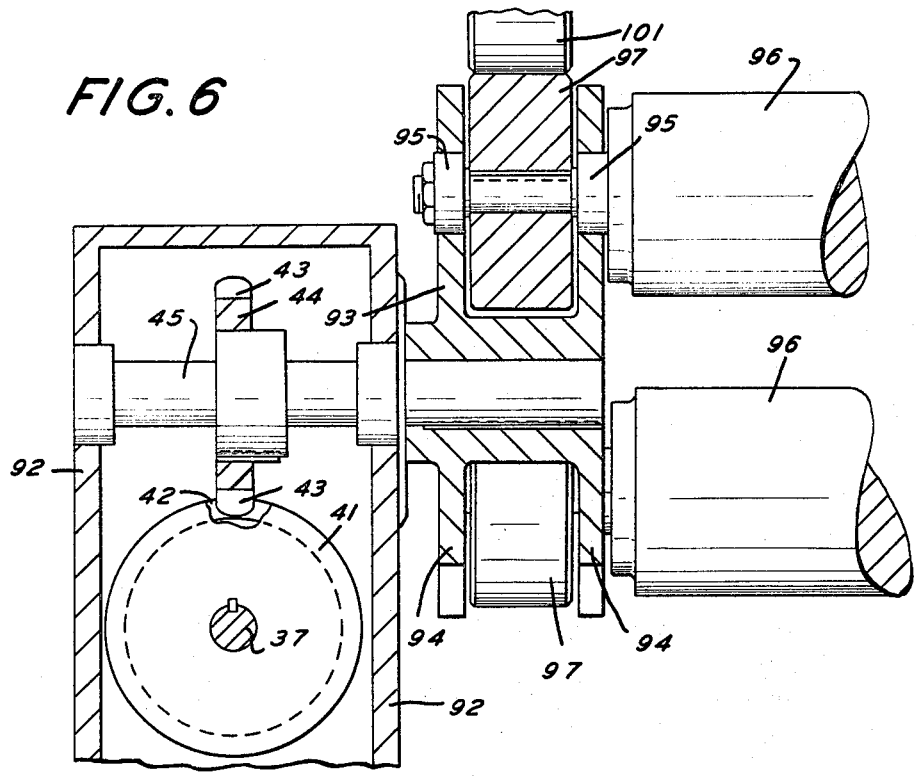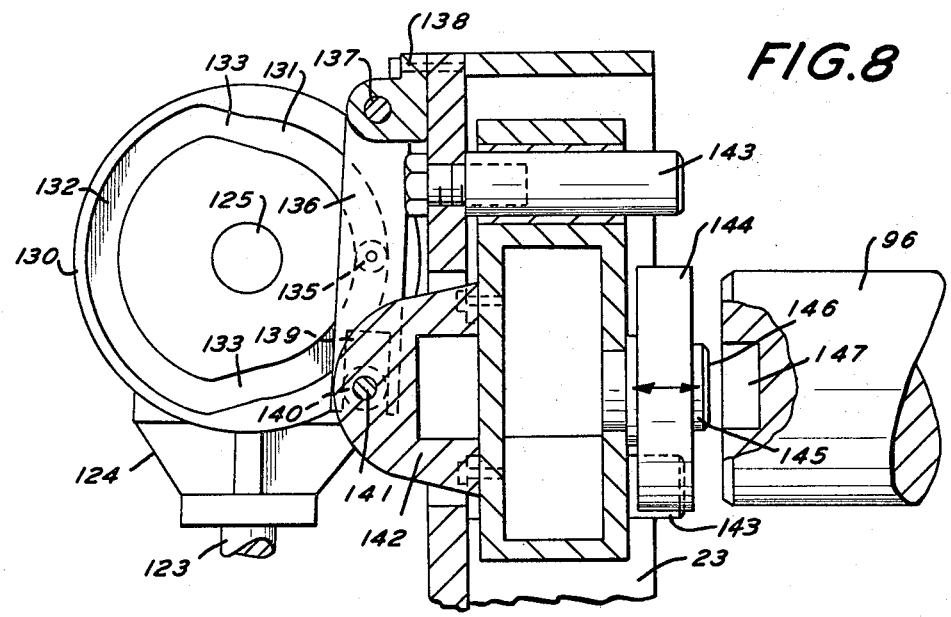

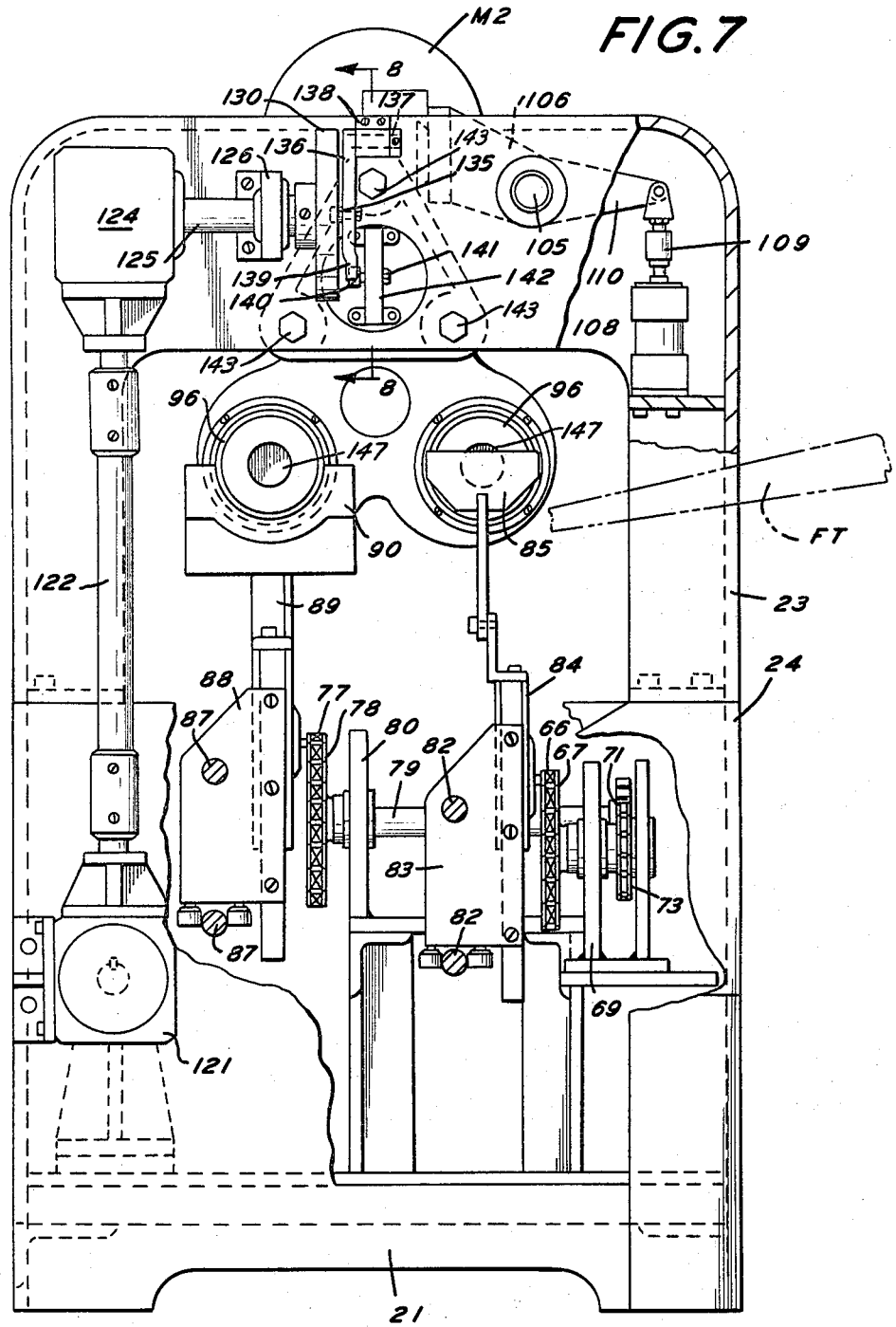

United States Patent Office 3,383,965
Patented May 21, 1968

3,383,965
TUBE RECUTTER
Joseph Snyderman, Philadelphia, Pa., assignor to John Eppler Machine Works, Inc., Philadelphia, Pa., a corporation of Pennsylvania
Filed Oct. 22, 1965, Ser. No. 500,903
4 Claims. (Cl. 82—101)

ABSTRACT OF THE DISCLOSURE

A tube recutter with a plurality of mandrels onto one of which a tube to be cut is fed, that mandrel then being advanced to another location for cutting of the tube, after which that mandrel is advanced to another location for stripping. Positive indexing for higher speed operation than heretofore is provided for the mandrels, the feeding and stripping mechanism being activated so as to be decelerated at each end of its action preferably by a planetary drive.

This invention relates to tube recutter, that is to a machine for cutting a long paper tube or the like, having printing on the exterior thereof, into a plurality of shorter tubes each of which is to serve as the side wall of a receptacle or container.

In my prior U.S. Patent No. 3,190,158, dated June 22, 1965, there is described a tube recutter which overcame numerous difficulties previously encountered.

The present invention embodies certain principles of the machine of my prior patent but by reason of improved features thereof permits of greatly increased speed of operation without damage to the tubes being cut and with a high degree of precision in cutting.

It is the principal object of the present invention to provide improved tube recutter capable of exceedingly high speed of operation in which a tube is supplied onto one mandrel, while a tube is being cut on a second mandrel, and severed tubes are being removed from a third mandrel, the mandrels being successively positioned at locations for this purpose.

It is a further object of the present invention to provide in a tube recutter of the character aforesaid improved indexing mechanism for the mandrels.

It is a further object of the present invention to provide a tube recutter in which a tube to be cut is supplied onto a free end of a mandrel, the mandrel is advanced to a location for cutting the tube into a plurality of shorter tubes, and the mandrel is then advanced for stripping the cut tubes from the free end of the mandrel, together with improved timed supporting mechanism for the free end of the mandrel during the cutting.

It is a further object of the present invention to provide a tube recutter in which a tube to be cut is supplied onto a free end of a mandrel, the mandrel is advanced to a location for cutting the tube into a plurality of shorter tubes, and the mandrel is then advanced for stripping the cut tubes from the free end of the mandrel, together with improved timed actuating mechanism for the supplying and stripping.

Other objects and advantageous features of the invention will be apparent from the description and claims.

The nature of characteristic features of the invention will be more readily understood from the following description taken in connection with the accompanying drawings forming part thereof, in which:

FIG. 3 is a fragmentary vertical longitudinal sectional view, taken approximately on the line 3—3 of FIG. 2;

FIG. 4 is a vertical sectional view taken approximately on the line 4—4 of FIG. 3;

FIG. 5 is a vertical sectional view, on a reduced scale, taken approximately on the line 5—5 of FIG. 4;

FIG. 6 is a vertical sectional view taken approximately on the line 6—6 of FIG. 2;

FIG. 7 is an end elevational view as seen from the right of FIG. 1; and

FIG. 8 is a fragmentary vertical sectional view, enlarged, taken approximately on the line 8—8 of FIG. 7.

Figure 1:
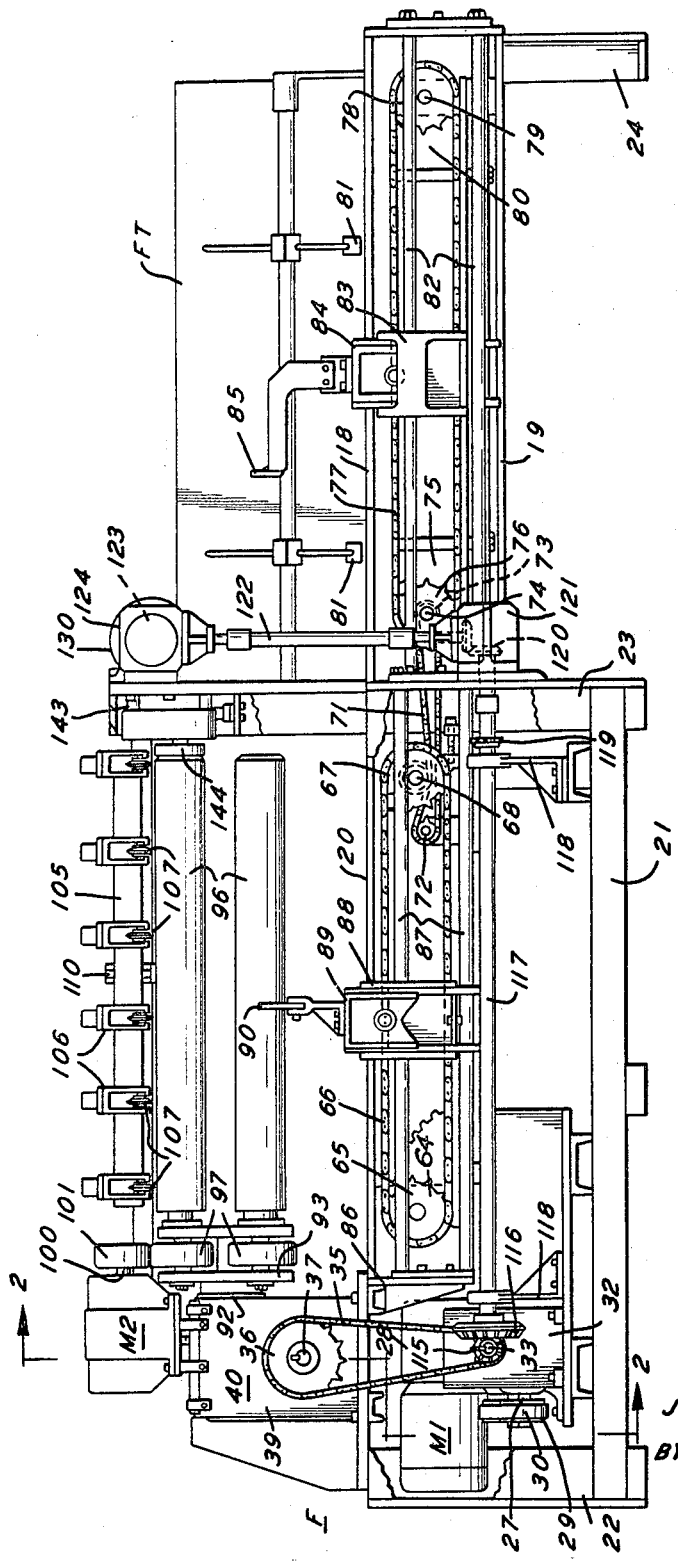
FIGURE 1 is a side elevational view of a tube recutter in accordance with the present invention.
Figure 2:
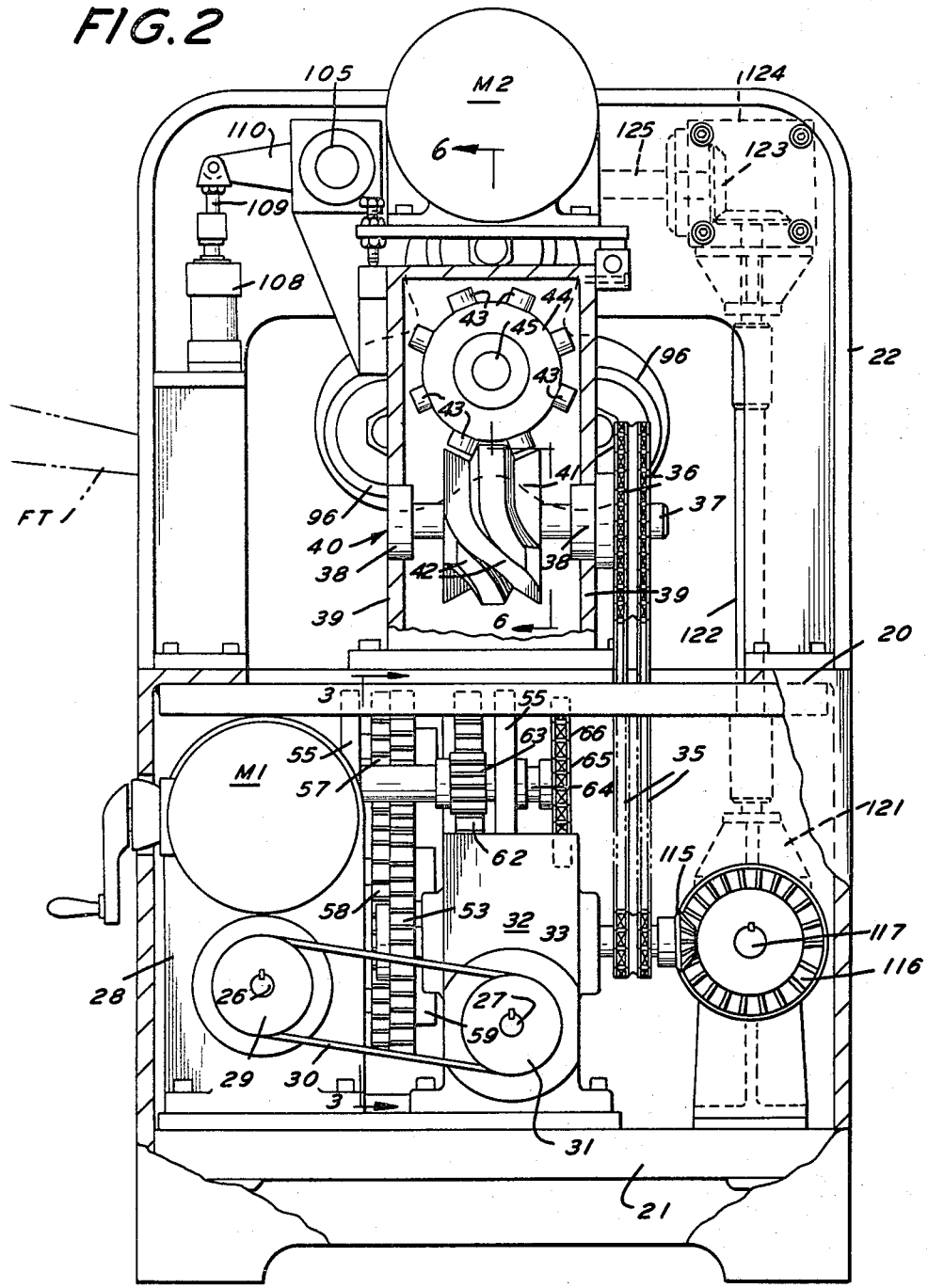
FIG. 2 is a transverse vertical sectional view, enlarged, taken approximately on the line 2—2 of FIG. 1.

It should, of course, be understood that the description and drawings herein are illustrative merely, and that various modifications and changes can be made in the structure disclosed without departing from the spirit of the invention.

Like numerals refer to like parts throughout the several views.

The tube recutter in accordance with the invention has a plurality of horizontal mandrels carried by a turret and advanced in a step by step relation. One of mandrels is positioned to have a tube to be cut applied thereon, another mandrel supports the tube for advance of the knives toward it for cutting, and another mandrel has the cut or severed tubes stripped therefrom.

As the mandrel on which the tube for cutting moves to a predetermined position it is retained at that position and held against further movement by the positioning mechanism, and a support is applied at the other end of the mandrel.

The cutting of the tube is effected by the cutter knives which are held by a controlled force, with accurate registry and with a minimum of waste.

The tube to be cut may be a spiral wound paper tube having on the exterior thereof a label or cover layer upon which are printed successive repeats of the desired exterior of the container which is completed when the ends have been applied to the cut length of the tube. The tube can be a convolute tube extruded plastic tube, or any other type of tube which it is desired to sever to accurate lengths of shorter tubes.

Referring now more particularly to the drawings, the tube recutter includes a frame F, having horizontal longitudinal frame sections 18, 19, 20 and 21 and transverse vertical frame sections 22, 23 and 24.

The driving, control and cutting mechanism is mounted between the locations of the frame sections 22 and 23, the tube supplying and tube applying mechanism being mounted between the locations of the frame sections 23 and 24.

The frame section 22 has carried thereon a first electric motor M1, with a variable speed reducer 28 driven thereby. The speed reducer 28, through pulley 29 on shaft 26 driven thereby is connected by a belt 30 which engages pulley 31 on the input shaft 27 of a variable speed reducer 32. The speed reducer 32 has one output shaft 33 with sprockets 34 thereon which through chains 35 thereon drive sprockets 36 on a drive shaft 37. The drive shaft 37 is journaled in bearings 38 in vertical frame plates 39 in an upper index housing 40.

The drive shaft 37, between the bearings 38 has an indexing cam 41 with cam ribs 42 thereon with which rotatably mounted follower rollers 43 on a follower head 44 engage. The head 44 is carried on a turret shaft 45. The cam 41 and follower rollers 43 are shaped and positioned so that there is no backlash, at least two followers 43 always being in contact with the faces of the cam ribs 42.

The cam ribs 42 have profiles giving an index angle of the order of 180° with the remainder providing a dwell, the action of the cam 41 being to quickly turn the turret shaft 45 through an angle of 120° followed by a protracted dwell, the cycle being continuously repeated for each group of feeding, cutting and stripping operations to be accomplished during the successive dwells.

The positive positioning of the turret shaft 45 avoids the necessity for separate locks for the turret shaft 45 while maintaining precision setting of the shaft 45.

The speed reducer 32 has an additional output shaft 50 (see FIGS. 2, 3, 4 and 5) for operating an intermittent driving mechanism preferably of the planetary and crank type for delivering a tube onto a mandrel and for stripping cut tubes from a mandrel, and in which the initiation of the tube delivering and stripping are slow to avoid initial impacts on the tubes followed immediately by accelerated action.

The shaft 50 has a drive gear 51 thereon which meshes with an idler gear 52 which in turn engages with a gear 53. The gear 53 is rotatably carried on a shaft 54 which is fixedly mounted in spaced vertical frame plates 55. The gear 53 has shafts 56 journaled thereon which carry gears 57 which engage a gear 58 keyed to the shaft 54.

The shafts 56 have cranks 59 keyed thereto which have end rollers 60 rotatably mounted thereon and engaged in guideways 61 on the face of an output gear 62. The gear 62 is journaled for free rotation on the shaft 54.

A pinion 63 on a shaft 64 engages the gear 62.

The shaft 64 has a sprocket 65 driven thereby. The sprocket 65 has thereon a tube stripper chain 66 which is also carried on a sprocket 67. The sprocket 67 is mounted on a shaft 68 journaled in a bracket 69 on the frame section 21.

The shaft 68 has a sprocket 70 secured thereto with a chain 71 engaged therewith, extending over an idler 72 and engaged with a sprocket 73 on a shaft 74.

The shaft 74 is journaled in a bracket 75 carried on the frame section 19 and drives a sprocket 76 on which a tube feed chain 77 is mounted. The chain 77 is carried on a sprocket 78 mounted on a shaft 79 which is journaled in a bracket 80 on the frame section 19.

Between the frame sections 23 and 24 feed head guide rods 82 are provided which carry a horizontally reciprocable feed head carriage 83 having vertical guides for a vertically reciprocable slide 84 upon which a tube feed head 85 is secured. The slide 84 is connected to a link of the chain 77 to move it along an upper tube applying path to the left (FIG. 1) then down around the sprocket 76, then along a lower clearance path to the right, then up around the sprocket 78 for another circuit. The tube feed head 85 thus, upon movement to the left, pushes a tube to be cut onto a waiting mandrel, as hereinafter pointed out, then moves out of the way and return to rise and push another tube onto the next waiting mandrel in timed relation and with control of the motion of the feed head 85 to avoid impact on the tube.

An inclined tube feed table FT is provided, of well known type, with swingable tube feeders 81 driven in timed relation.

Between a vertical frame plate 86 carried by a frame section 20 and the frame section 23 stripper head guide rods 87 are provided which carry a horizontally reciprocable stripper head carriage 88 having vertical guides for a vertically reciprocable slide 89 upon which a tube stripper head 90 is secured. The slide 89 is connected to a link of the chain 66 to move it in along an upper cut tube stripping path to the right (FIG. 1) then down around the sprocket 67, then along a lower clearance path to the left, then up around the sprocket 65 for another circuit. The tube stripper head 90 thus, upon movement to the right, advances to the tube without objectionable impact, pushes a group of cut tubes from a mandrel, as hereinafter pointed out, and then moves out of the way and returns to push another group of cut tubes as before.

The turret drive shaft 45 is journaled in vertical frame plates 92 and has a turret head 93 keyed thereon. The head 93 has spaced turret head plates 94 secured together and carrying spaced bearings 95 for the reception of horizontal mandrels 96, three being shown. Each of the mandrels 96, between the plates 94 has a mandrel driving pulley 97 keyed thereto.

The upper main housing section 39 has a second electric motor M2 carried thereon with its output shaft 100 having a driving pulley 101 thereon for driving a particular pulley 97 brought into engagement therewith. The driving pulley 101 can have its periphery of rubber or other resilient and high friction material.

A knife mounting bar 105 is provided having adjustable clamps 106 thereon for rotary blades 107 which are to be brought into engagement with a tube to be cut on the uppermost mandrel 96. The bar 105 is positioned in any desired manner but preferably by a fluid pressure cylinder 108 with an actuating rod 109 extending therefrom to an actuating arm 110 on the bar 105. If desired the cutter mechanism shown in detail in my prior Patent No. 3,190,158 can be employed.

The shaft 33 has a bevel gear 115 keyed thereto which engages a gear 116 keyed to a longitudinal shaft 117 journaled in brackets 118 carried by the frame section 21. The shaft 117 can have a sprocket 119 thereon for power takeoff for the mechanism (not shown) for operating the tube feeders 81.

The shaft 117 is connected through gearing 120 in a housing 121 supported on the frame section 21 to a vertical shaft 122 which is connected by gearing 123 in a housing 124 to a cam shaft 125.

The cam shaft 125 is journaled in a bracket 126 on the frame section 23 and has a mandrel support control cam 130 keyed thereto.

The cam 130 as shown in FIG. 8 has for purposes of illustration, turned from the position different from its position in FIG. 1. The cam 130 preferably has a groove therein with an arcuate portion 131 for turret indexing of the order of 170°, an arcuate portion 132 for turret dwell of the order of 144°, and equal transition portions 133 therebetween.

The cam 130 has a follower roller 135 in engagement therewith, the roller 135 being carried on a control arm 136 which is mounted on a pivot pin 137 in a bracket 138.

The arm 136 has a bifurcated end 139 within which a roller 140 is engaged.

The roller 140 is on a shaft 141 secured to a slide head 142. The slide head 142 is slidably carried on fixed slide pins 143 and has stop block 144 in which a mandrel engaging and supporting plug 145 is journaled. The plug 145 has a chamfered end 146 and is adapted to be moved into a complementary end opening 147 in the free end of each mandrel 96 when the same is in alignment therewith.

The mode of operation will now be pointed out.

The rotation of the motor M2 is effective through the pulley 100 for rotating the uppermost mandrel 96 by its engagement with the mandrel driving pulley 97. This mandrel 96 will previously have had an elongated tube applied thereto for cutting.

The rotation of the motor M1 is effective through the speed reducer 32 for driving the shaft 33 and the shaft 117 to rotate the sprocket 119 to drive the mechanism (not shown) for actuating the tube feeders 81 to successively supply tubes for cutting.

Rotation of the shaft 33, through the sprockets 34, the chains 35, the sprockets 36 and the shaft 37 is effective for rotating the index cam 41 which provides a dwell during which cutting occurs on one mandrel 96, tube applying occurs on another mandrel 96, and cut tube stripping occurs on another mandrel 96. Between dwells, the index cam 41 provides the indexing movement of the turret head 93 for advancing a mandrel 96 to a fixed location onto which a tube has been applied to a fixed position for cutting, advancing the mandrel 96 on which a tube has been cut to a fixed position for stripping, and advancing the mandrel 96 from which a cut tube has been stripped to a fixed position for another tube to be applied thereto.

Rotation of the shaft 50 is effective through the planetary mechanism for intermittently operating the sprocket 65 so that it virtually comes to rest at locations at which the feed head 85 and stripper head 95 initially engage the tubes, thereby to avoid objectionable impact on the tubes, followed by accelerated movement for feeding and stripping.

This intermittent motion is obtained through the gear 53 which through its motion actuates the gears 57 and the shafts 56 to impart movement to the cranks 59. The cranks 59, by their movement in the guideways 61 impart motion to the gear 62 and therefrom to the sprocket 65. The timed and controlled motion of the sprocket 65 provides improved movement of the stripper head 95 and feed head 85 from a virtual stop followed by a period of rapid actuation for advancing movement toward the left (FIG. 1) of the stripper head 95 to remove a cut tube from one mandrel 96 and of the feed head 85 toward the left for simultaneously applying a tube onto a mandrel 96 on the turret head 93, and return movement for the next cycle.

As soon as the turret head 93 comes to rest upon completion of an indexing step the cam 130 has moved the control arm 136 to engage the plug 145 in the end opening 147 of the mandrel 96 advanced by indexing to a location where this can be effected, and retracted after completion of the cutting. The engagement of the plug 145 provides a support and bearing for the free end of the mandrel 96 on which tube cutting is effected in timed relation by the cutter blades 107 which are moved to engage the tube to be cut. After the cutting has been completed and before the mandrel 96 on which the cutting has occurred is moved to a position for stripping, the plug 145 is retracted by the action of the cam 130 to avoid any interference with the indexing.

The continuous step by step supplying, cutting and stripping is repeated in very rapid sequence, with the tube adequately supported for cutting and with accurate indexing of the turret head 93 carrying the mandrels 96.

I claim:
1. In a tube cutting machine having
   a mandrel rotatably supported at one end,
   members for feeding a tube to be cut onto the mandrel from the other end thereof at one location,
   members for advancing the mandrel to another location for tube cutting and to another location for stripping, and
   members for stripping cut tubes from said mandrel, the improvement which comprises
   means for positively indexing said mandrel, said means including a cam having a plurality of followers in continuous engagement therewith for effecting positive motion without backlash, the indexing angle of said cam being of the order of 180°.

2. A tube cutting machine as defined in claim 1 in which
   means is provided for actuating said members for feeding and said members for stripping in unison, and said means includes a driving mechanism with variation in the speed of movement of said members.

3. A tube cutting machine as defined in claim 2 in which
   said means has a decelerated movement at at least one end of the movement of at least one of said members.

4. A tube cutting machine as defined in claim 2 in which
   said last means includes a planetary driving mechanism.

References Cited
UNITED STATES PATENTS

| | | | |
|---|---|---|---|
| 3,084,578 | 4/1963 | Hartford | 82—101 X |
| 3,190,158 | 6/1965 | Snyderman | 82—101 |
| 3,261,246 | 7/1966 | Kuts | 82—101 |
| 3,302,500 | 2/1967 | Hackerberger | 82—101 X |

HARRISON L. HINSON, *Primary Examiner.*